Feb. 24, 1942.  E. D. EKKEBUS ET AL  2,274,234
OIL SEAL FOR MOVING PARTS
Filed Nov. 9, 1940  2 Sheets-Sheet 1
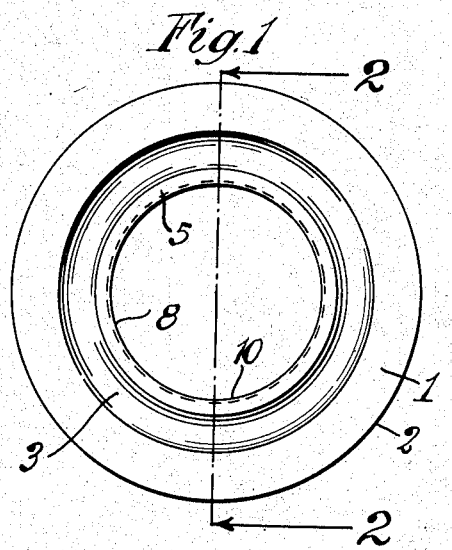
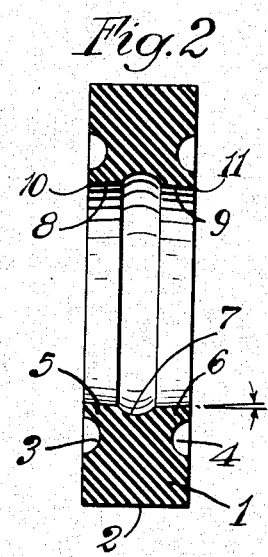
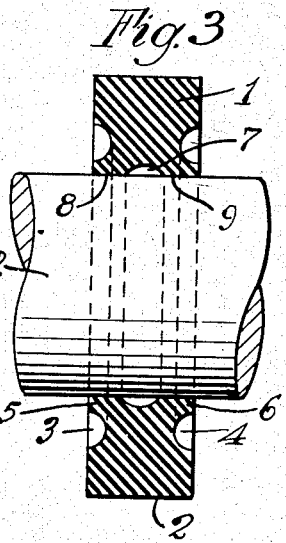
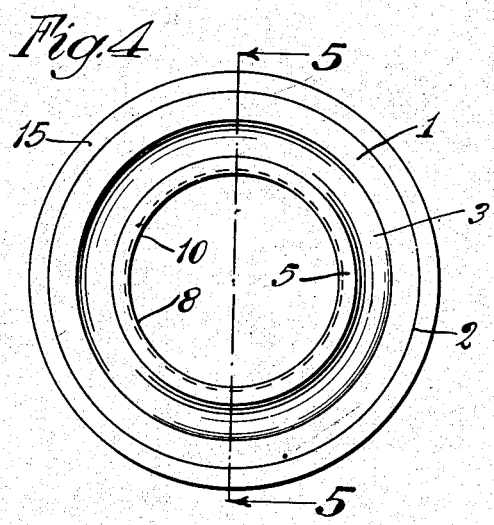
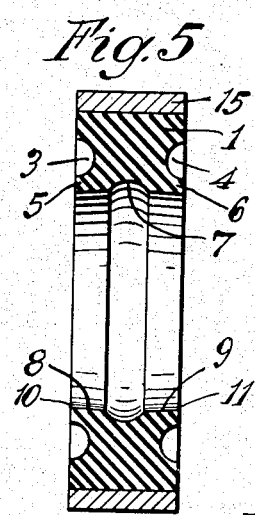
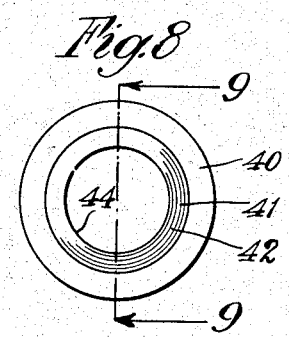
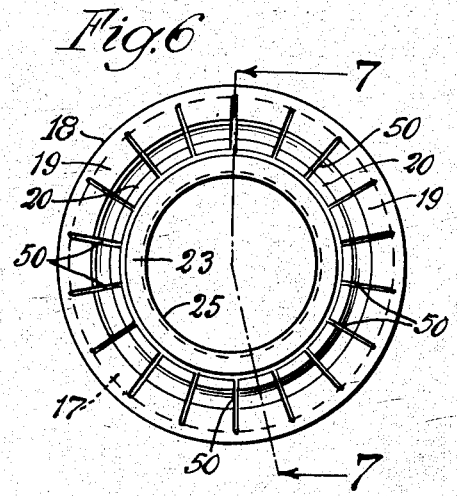
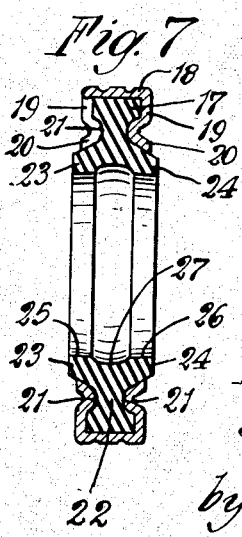
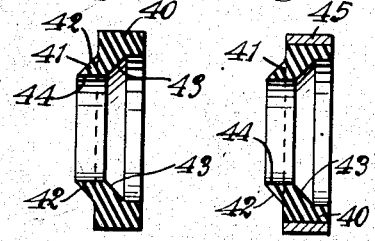
Inventors
Eloy D. Ekkebus
John C. Gallagher
by Parker & Carter
Attorneys.

Feb. 24, 1942.  E. D. EKKEBUS ET AL  2,274,234
OIL SEAL FOR MOVING PARTS
Filed Nov. 9, 1940  2 Sheets-Sheet 2
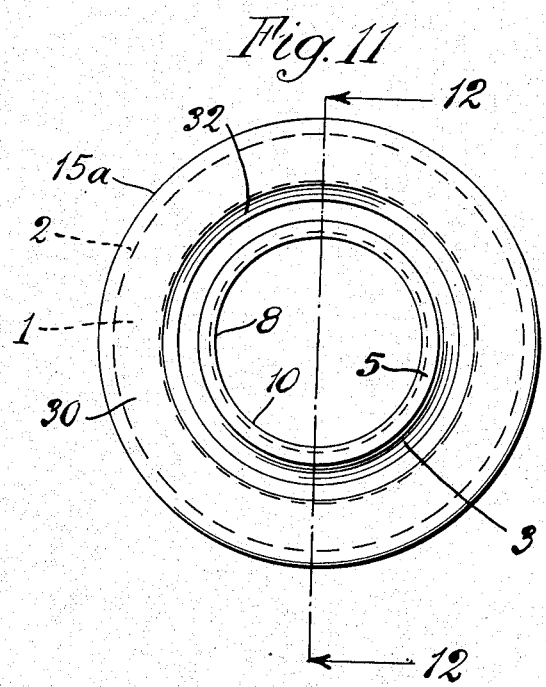
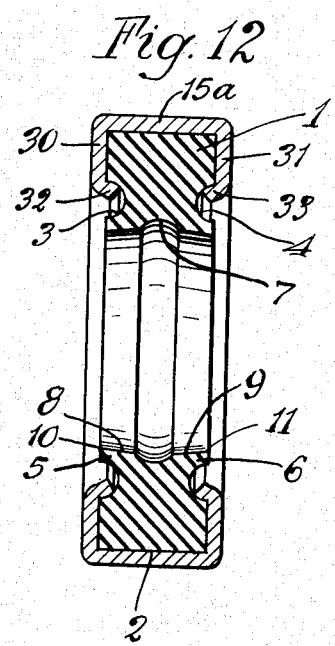
Inventors
Eloy D. Ekkebus
John C. Gallagher
by Parker & Carter
Attorneys.

Patented Feb. 24, 1942

2,274,234

UNITED STATES PATENT OFFICE 2,274,234

OIL SEAL FOR MOVING PARTS

Eloy D. Ekkebus, Mount Prospect, and John C. Gallagher, Chicago, Ill., assignors to Chicago Belting Company, Chicago, Ill., a corporation of Delaware Application November 9, 1940, Serial No. 365,030

2 Claims. (Cl. 288—3)

Our invention relates to an improvement in oil seals, and has for one purpose the provision of a seal which may be applied to a reciprocating or rotating member, shaft, or the like.

Another purpose is the provision of such a seal which is effective to prevent escape of a fluid lubricant through an aperture through which passes a shaft or the like.

Another purpose is the provision of such a seal as will simultaneously prevent the escape of lubricant and the penetration of dust, grit, or other foreign material.

Another purpose is the provision of an improved oil seal for shafts and the like which shall have a vastly longer life than oil seals currently available in the art.

Another purpose is the provision of a combined oil seal and jacket therefor.

Other purposes will appear from time to time in the course of the specification and claims.

We illustrate our invention more or less diagrammatically in the accompanying drawings wherein:

Fig. 1 is a side elevation of one form of our device;

Fig. 2 is a section on the line 2—2 of Fig. 1;

Fig. 3 is a similar section illustrating the seal as applied to a shaft;

Fig. 4 is an elevation similar to Fig. 1, illustrating the employment of a confining ring;

Fig. 5 is a section on the line 5—5 of Fig. 4;

Fig. 6 is a view similar to Figs. 1 and 4, of a still further variation;

Fig. 7 is a section on the line 7—7 of Fig. 6;

Fig. 8 is a similar view of a variant form;

Fig. 9 is a section on the line 9—9 of Fig. 8;

Fig. 10 is a similar section, illustrating the employment of a confining metal ring with the seal;

Fig. 11 is a plan view of a further variant form; and

Fig. 12 is a section on the line 12—12 of Fig. 8.

Like parts are indicated by like symbols throughout the specification and drawings.

Referring to the drawings, 1 generally indicates a sealing ring, herein shown as having an exterior cylindrical surface 2. It will be understood, of course, that the exterior surface may be varied or modified to suit the particular needs as regards the space into which the sealing ring must be fitted.

3, 4 indicate channels, which define an intermediate portion of reduced axial length. Extending radially inwardly are two lip portions 5, 6, which may be separated for example by a channel 7. Each such lip portion has an inner generally cylindrical surface 8, 9, these surfaces being slightly tapered, with their edge of minimum diameter located outwardly, as at 10 and 11. This slight taper is sufficient to cause the thrust against the shaft 12 when the sealing ring is mounted on a shaft. The angle, however, and the reduced diameter of the faces 8, 9 is slight and has been somewhat exaggerated in Fig. 2. What is important is that the surfaces 8, 9 shall be sufficiently smaller in diameter than the exterior of the shaft 12, particularly along the lip edges 10 and 11, to maintain a thrust of the sealing surfaces so defined against the exterior of the shaft 12.

Referring to Figs. 4 and 5, we find it frequently, if not generally, desirable to employ some bonding or confining member, such as the metal ring 15, which may be, if desired, permanently bonded to the seal ring and which serves to confine it and also to provide a metal to metal contact with any suitable exterior housing, socket, abutment, or the like, which should be sufficiently tight to prevent any leakage about the exterior of the seal.

Referring to Figs. 6 and 7, we illustrate a variant form in which the outer ring portion 17 is entirely housed within a metal shell having an exterior wall 18 and side walls 19. These side walls have an interior offset portion 20, which penetrates channels 21, forming an intermediate portion of the ring of reduced thickness, as at 22. The ring then is extended along the axis of the shaft in opposite directions, as at 23, 24, to form what we may call lip portions, having slightly tapered inner faces 25, 26, separated by a channel 27. The lower portions of the walls 19 are shown as extending outwardly above the upper surfaces of said lip portions 23, 24. In practice, the gauge of the metal may be sufficiently thin and the stock used may be such as to provide a spring action on the part of the metal, which supplements the compression of the rubberlike material of which the ring is formed. In most cases, however, this supplemental metallic spring action is not necessary, and no means for employing it are shown in the form of Figs. 1 to 5.

In Figs. 11 and 12 we illustrate a variant of the form of Figs. 4 and 5, in which the ring 15a is provided with inwardly extending flanges 30, 31, terminating in lips 32, 33, which hook into the channels 3, 4. These side walls of metal are advantageous where a metal to metal press fit is desired and where the workman finds it convenient to hammer the seal into place.

Referring to Figs. 8, 9 and 10, we illustrate an annular body 40, which may be of any suitable rubber substitute and which has inwardly and longitudinally extending from one side a lip portion 41, defined by opposed generally parallel faces 42, 43, which may for convenience be at an angle of forty-five degrees in relation to the axis of the ring. The inner surface 44 may be cylindrical, and is preferably somewhat less in diameter than the diameter of the rod or shaft which it is to surround. The result is a continuing thrust or sealing action of the lip portion 41 against the opposed surface of the rod. We may, if we desire, employ a permanently secured surrounding ring 45 of metal or the like.

It will be realized that, whereas we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

Where in the description or claims we use the term "rubber substitute," we wish it to be understood as meaning a substance having the general characteristics of rubber so far as relates to compressibility, flexibility, etc., but which is free from the disadvantage of deteriorating upon being subjected to oil or grease. A number of such substances are available on the market, such for example as Duprene, Neoprene, Buna, etc.

The use and operation of our invention are as follows:

In sealing moving parts, such as rotating or reciprocating shafts where the speed of rotation or reciprocation is considerable, a difficult problem is presented. Rubber is not practical since it deteriorates very rapidly. The same is generally true of leather. Oil seals of rubber or of leather, if they will stand up at all, have to be frequently replaced. We have developed, however, an oil seal which will prevent the escape of oil along a shaft and will prevent the penetration of dust or grit or foreign material along the shaft to the lubricant containing space, and which at the same time will present a minimum frictional resistance to the movement of the shaft, and will thus reduce heating to a minimum and lengthen the life of the seal. We employ rubber substitutes, such as Duprene, Neoprene, Buna, or the like, substances which have the general characteristics of rubber as regards flexibility and compressibility, but which, however, are resistant to heat and to oil and grease.

We find it desirable to employ some lubricating agent in the material used, such for example as graphite, or some equivalent therefor. We also find that in practice any one of the above materials will receive by adsorption a certain amount of oil or grease during use. This takes place, for example, in the areas or layers of the seal which are closest to the moving shaft or member. It is a fact that in use the seals tend to become both tighter and better lubricated by the incorporation of a certain amount of the lubricant in the surface layers of the seal, which simultaneously provides lubricant for the seal surface and increases the actual bulk of the sealing ring, and thus maintains pressure against the face of the metal. Since these rubber substances tend to build up and swell in use, we find it desirable, although not absolutely necessary, to employ a confining means, such for example as the ring of Figs. 4 and 5, or the housing or casing of Figs. 7 and 12. The ring prevents any outward bulge or increase in effective diameter of the seal, which might otherwise take place, and provides a compact sealing element which may be easily applied. The employment of the housing or confining casing of Fig. 12 has the further advantage that the user can hammer the sealing unit into its seat, a procedure which is common practice. Preferably the housing is so formed, as shown in Fig. 12, so as to confine the outer part of the ring while permitting a certain flexure of the lip portions themselves. As a matter of fact, however, a sealing thrust is obtained rather by the bodily distortion of the material than by the flexure of the lip itself, although both may have that effect.

One of the advantages of having an outside metallic ring or housing, such as is shown for example in Figs. 5, 7 and 12, is the advantage of having a metal to metal press fit about the outside of the unit, which will be sufficiently tight to prevent any leakage.

In the form shown in Fig. 7 the metal housing extends inwardly from the outer periphery of the seal toward the shaft, along the outer wall of the lip, terminating short of the extreme outer edge of the lip, so that the flexible lip is free to expand and contract without being too greatly constricted in its movement by the metal housing.

The radial lines shown at 50 in Fig. 6 indicate slots formed in the body of one of the side walls 19. In manufacture this side wall 19 will at one stage in the operation be parallel with the exterior wall 18, and is subsequently bent into the shape shown in Fig. 7. Notches or slots will be cut in such side wall 19 so that when bent into the shape shown in Fig. 7 the opposed boundaries of these notches will come into contact with one another, producing what is in effect a continuous ring.

In this form a relatively thin sheet metal may be employed, and a certain spring action of the metal may be relied upon. In most instances, however, we find that this is unnecessary, and, for example in the forms other than that of Fig. 7, the thrust of the oil seal against the shaft is obtained by the distortion of the material of the seal itself, and no additional spring action is needed. Actually, the increased size of the shaft in relation to the somewhat smaller diameter of the opposed face of the seal causes an expansion of the seal, and the elastic effect is the maintenance of a final thrust of the seal against the opposed metallic surface of the shaft.

In the form of Figs. 2, 5 and 7 we find it desirable to somewhat taper the bore of the seal. For example, referring to Fig. 2, the angle may be anything from 0 to 3°. In the form of Figs. 9 and 10 this taper is unnecessary, and the inner surface of the seal, as at 44, may be truly cylindrical if desired. The opposite walls of the lip or inner flange may be parallel, and in Figs. 9 and 10 we illustrate the angle as 45°, although, of course, a variation from that angle may be employed. The lip so formed is bodily expanded or flexed by the engagement of the cylindrical surface with the outer face of the cylinder, and a constant thrust or pressure is maintained against the surface of the shaft.

If desired, a plurality of bodies 40 may be used in tandem, one telescoped within the other if desired.

It will be understood that, as to the form of

Figs. 2 and 9, where the metal ring is omitted, any suitable housing may be employed to confine the exterior of the ring. The ring, in other words, may fit into any suitable housing or socket, it being essential, of course, that it be confined in position, and that there is a sufficiently tight exterior fit to prevent leakage around the outside of the seal.

I have referred in the specification to the metal ring 15, to the outer metal shell having an exterior wall 18, and to the metal ring 45. It will be understood that, while these members are preferably of metal, they may be of other suitable material, such as any one of a number of thermoplastics, or even perhaps of rubber or rubberlike material so treated as to be relatively rigid and metal-like rather than rubberlike in their physical characteristics, the point being that each of these elements is stiffer, harder and very much more resistant to distortion than is the rubberlike body of the seal.

We claim:

1. In a unitary oil seal structure for shafts and the like an integral, annular, relatively massive body of compressible, flexible material, said body having a generally cylindrical exterior surface and generally parallel end faces, said end faces being penetrated by circumferential channels of generally semi-circular cross-section, said channels being located substantially closer to the inner than to the outer face of said annular body, and penetrating said body to a depth substantially less than half the axial length of the body, the inner face of said body being generally cylindrical and being divided into two parts by a relatively shallow channel having an axial extension exceeding its depth, said inner face at opposite sides of the central channel being slightly oppositely tapered from a minimum diameter at each end toward a maximum diameter adjacent the central channel, the minimum diameter of the inner face, prior to the application of the oil seal to a shaft, being slightly less than the diameter of the face to which it is applied, the width of the connection between the annular body and the lip portions defined between said channels being greater than the depth of the connecting channels and being sufficient to subject the lip portions as a whole to the compression of the massive annular body, while permitting a slight flexure of the lip portions.

2. In a unitary oil seal structure for shafts and the like, an integral, annular, relatively massive body of compressible, flexible material, said body having a generally cylindrical exterior surface and generally parallel end faces, said end faces being penetrated by circumferential channels of generally semi-circular cross-section, said channels being located substantially closer to the inner than to the outer face of said annular body, and penetrating said body to a depth substantially less than half the axial length of the body, the inner face of said body being generally cylindrical and being divided into two parts by a relatively shallow channel having an axial extension exceeding its depth, said inner face at opposite sides of the central channel being slightly oppositely tapered from a minimum diameter at each end toward a maximum diameter adjacent the central channel, the minimum diameter of the inner face, prior to the application of the oil seal to a shaft, being slightly less than the diameter of the face to which it is applied, the width of the connection between the annular body and the lip portions defined between said channels being greater than the depth of the connecting channels and being sufficient to subject the lip portions as a whole to the compression of the massive annular body, while permitting a slight flexure of the lip portions, and a shell of metal surrounding and connected to the massive annular body and conforming to its exterior, generally cylindrical surface.

ELOY D. EKKEBUS.
JOHN C. GALLAGHER.